No. 768,720. PATENTED AUG. 30, 1904.
J. R. BARKER.
HEATER.
APPLICATION FILED NOV. 24, 1902.
NO MODEL. 4 SHEETS—SHEET 1.

Witnesses:
E. F. Wilson
Arthur C. Lotz

Inventor:
John R. Barker
By Rudolph Wm. Lotz
Attorney.

No. 768,720. PATENTED AUG. 30, 1904.
J. R. BARKER.
HEATER.
APPLICATION FILED NOV. 24, 1902.
NO MODEL. 4 SHEETS—SHEET 2.

Witnesses:
E. F. Wilson

Inventor:
John R. Barker
By Rudolph —— Attorney

No. 768,720. PATENTED AUG. 30, 1904.
J. R. BARKER.
HEATER.
APPLICATION FILED NOV. 24, 1902.
NO MODEL. 4 SHEETS—SHEET 3.

Witnesses:
E. F. Wilson
Arthur C. Fox

Inventor:
John R. Barker
By Rudolph M. Fox
Attorney.

No. 768,720. PATENTED AUG. 30, 1904.
J. R. BARKER.
HEATER.
APPLICATION FILED NOV. 24, 1902.
NO MODEL. 4 SHEETS—SHEET 4.
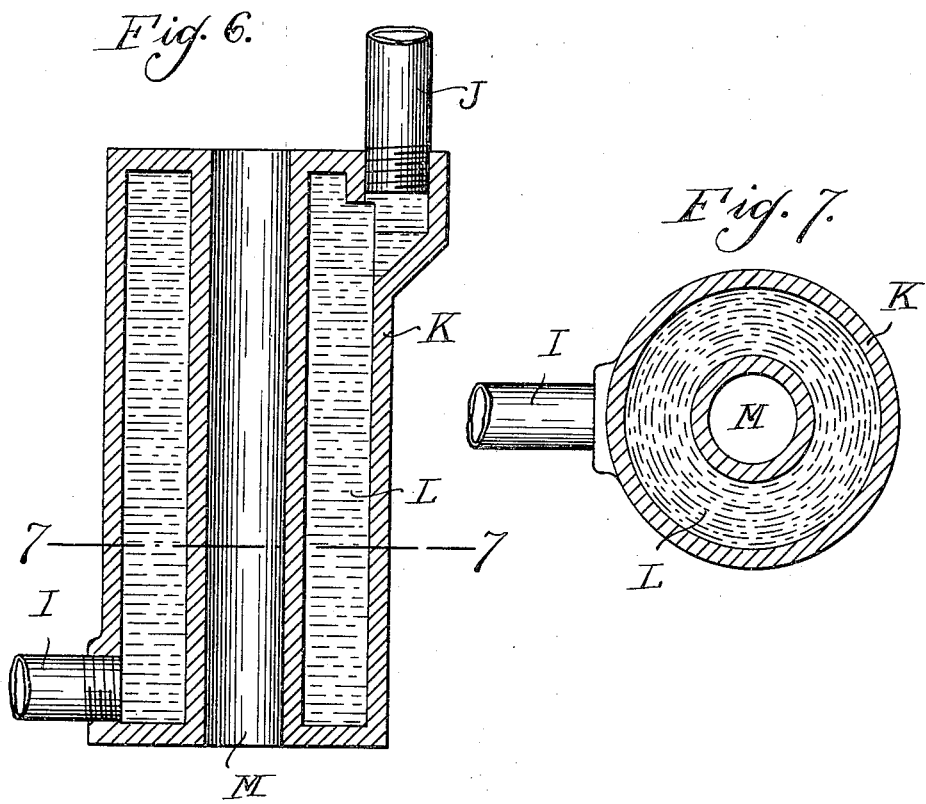

No. 768,720.

Patented August 30, 1904.

UNITED STATES PATENT OFFICE.

JOHN R. BARKER, OF CHICAGO, ILLINOIS.

HEATER.

SPECIFICATION forming part of Letters Patent No. 768,720, dated August 30, 1904.

Application filed November 24, 1902. Serial No. 132,681. (No model.)

*To all whom it may concern:*

Be it known that I, JOHN R. BARKER, a citizen of the United States, residing at Chicago, in the county of Cook and State of Illinois, have invented certain new and useful Improvements in Heaters; and I do hereby declare the following to be a full, clear, and exact description of the invention, such as will enable others skilled in the art to which it appertains to make and use the same.

My invention relates to a novel construction in a heater, the object being to provide a heater combining in one apparatus an air-heating furnace and a water-heater; and it consists in the features of construction and combinations of parts hereinafter fully described and claimed.

Figure 1:
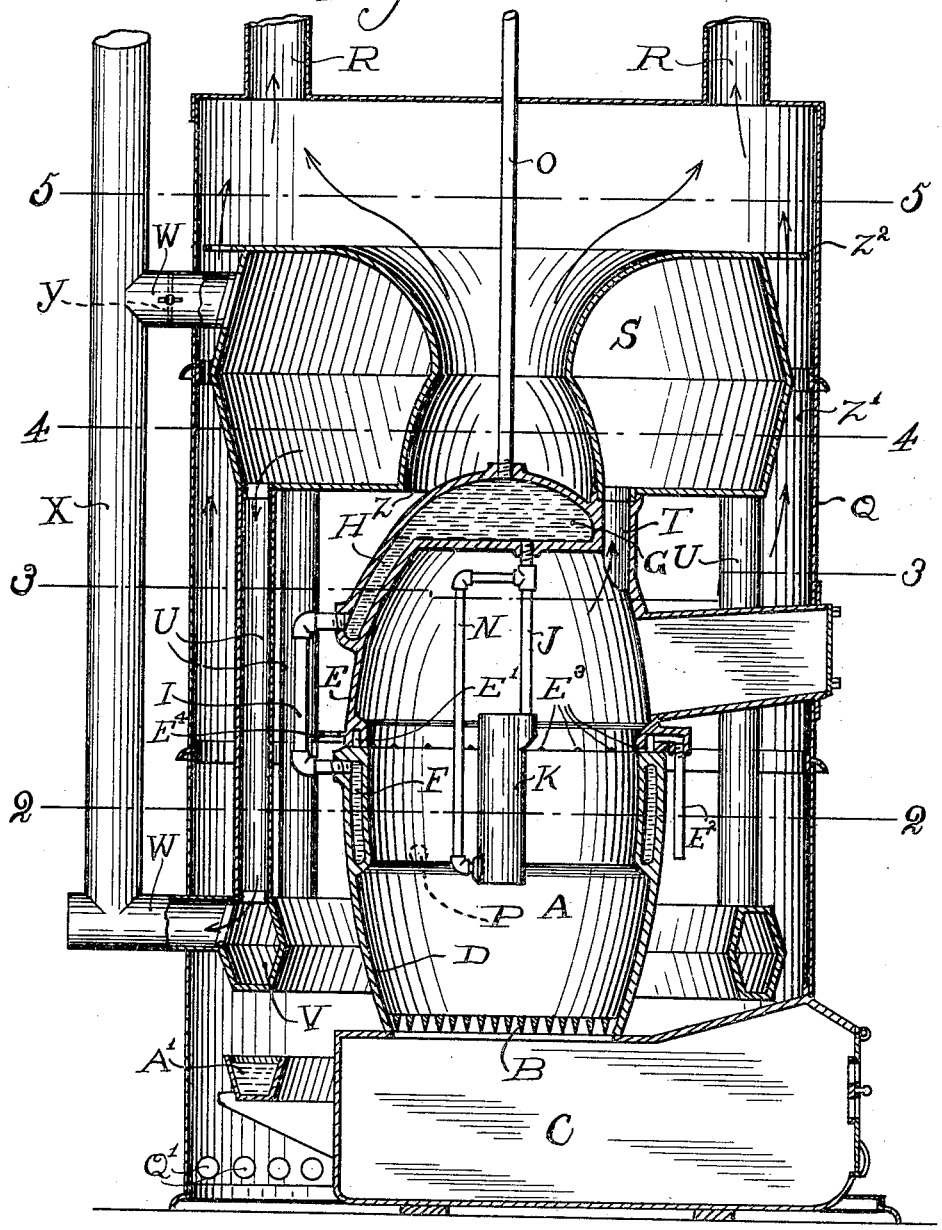
Figure 2:
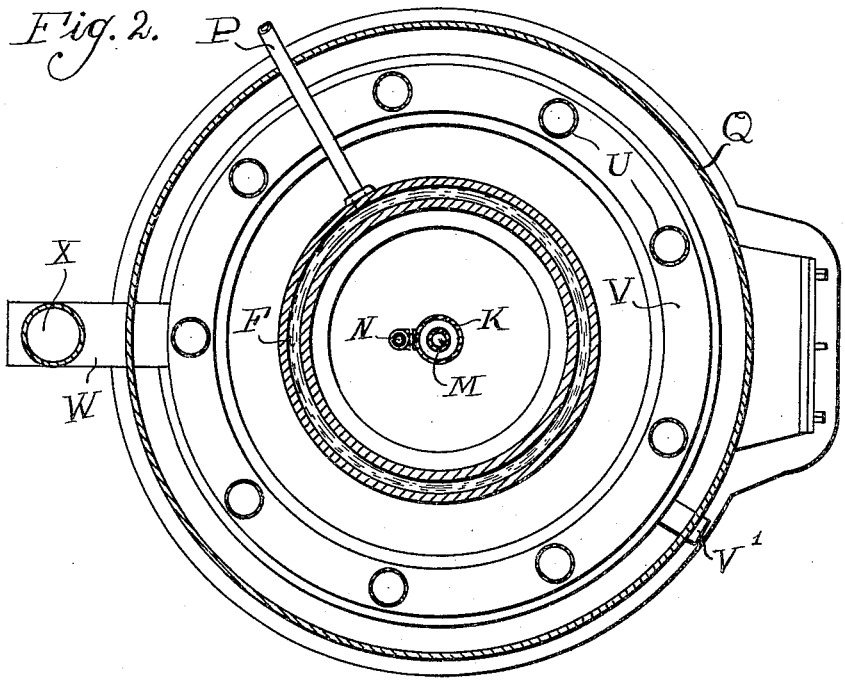
Figure 3:
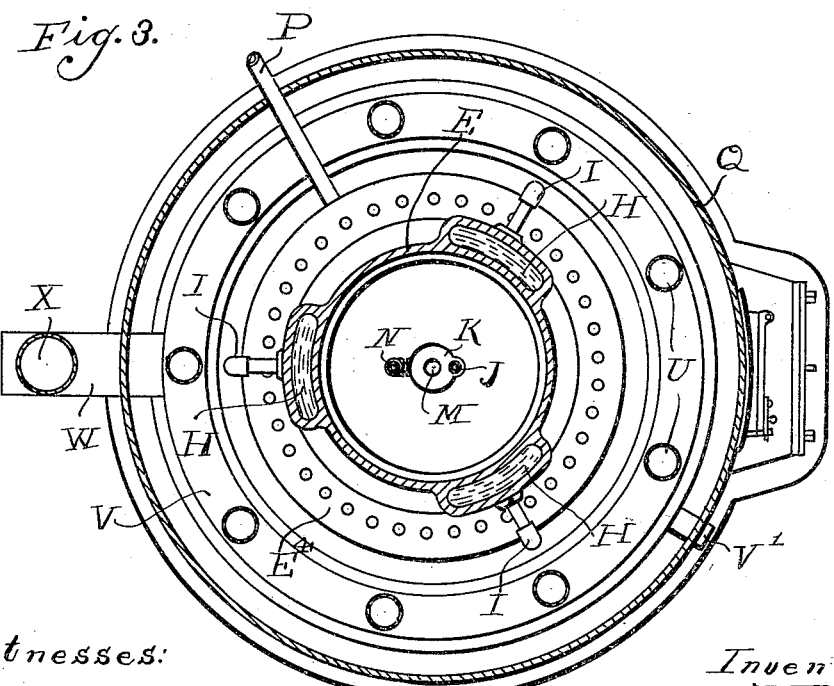
Figure 4:
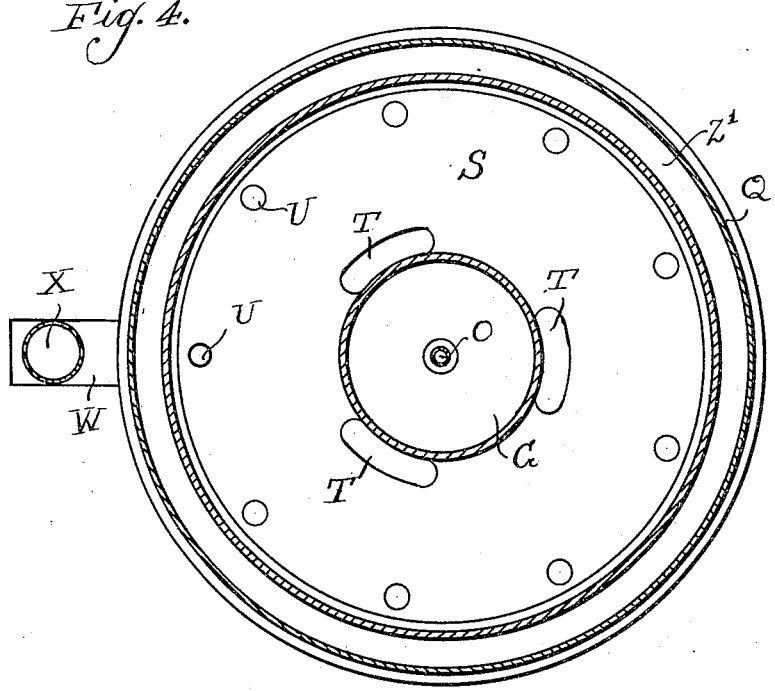
Figure 5:
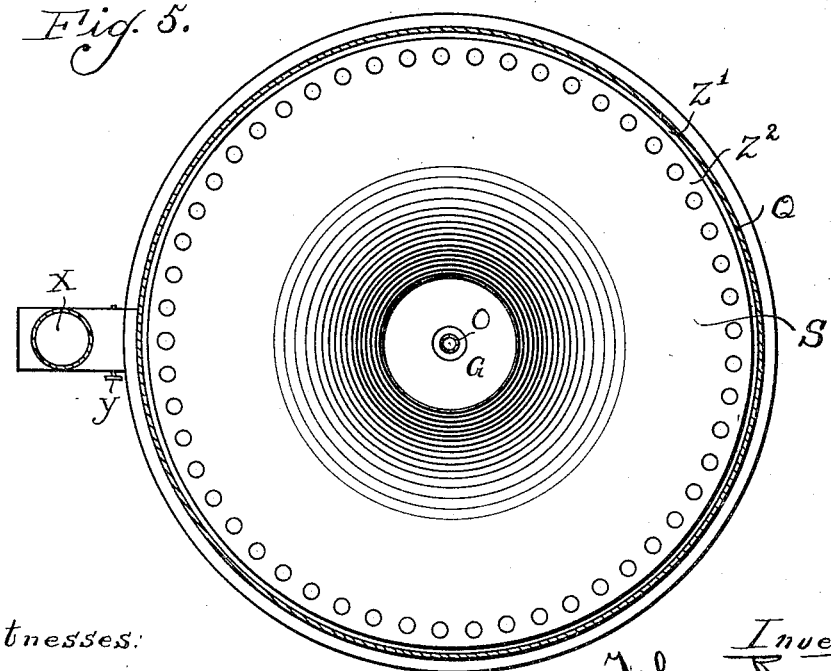

In the accompanying drawings, illustrating my invention, Figure 1 is a central vertical section of a heater constructed in accordance with my invention. Fig. 2 is a transverse section of same on the line 2 2 of Fig. 1. Fig. 3 is a transverse section on the line 3 3 of Fig. 1. Fig. 4 is a transverse section on the line 4 4 of Fig. 1. Fig. 5 is a transverse section on the line 5 5 of Fig. 1. Fig. 6 is a central longitudinal section of a water-drum interposed in the fire-pot. Fig. 7 is a transverse section of same on the line 7 7 of Fig. 6.

In said drawings, A indicates the fire-pot, B the grate, and C the ash-pit. The said fire-pot A is practically egg-shaped and consists of a lower section D and an upper section E. The said lower section D is provided at its upper end with an annular water-chamber F, and said upper section E is provided at the dome with a water-chamber G, which is extended downwardly at three points, forming three arms or branches H of said chamber G, each of said branches H being connected at its lower end with said chamber F by means of a pipe I, which enters said chamber F at its upper edge. Connected with said chamber G and depending therefrom by means of a pipe J is a water-drum K, having an annular water-chamber L and a central flue M. Said pipe J, which is connected with the upper end of said chamber L, serves as both an inlet and an outlet to said chamber. A branch pipe N connects the upper end portion of said pipe J with the lower end of said water-chamber L and serves to aid the circulation of the water through same. The water heated in said various water-chambers passes upwardly through the pipe O to radiators suitably placed and returns to the chamber F through the return-pipe P, which enters said chamber F near its lower edge. The said fire-pot A is suitably mounted in a cylindrical casing Q, which is adapted to receive air at its lower end through the air-inlets Q', which by contact with the heated surfaces within said casing becomes heated and is distributed to various parts of a building through the flues R, leaving said casing at its upper end. In order to afford the largest possible area of heating-surfaces within said casing and absorb as much as possible of the heat of the fire, I have provided an annular smoke-flue S above said fire-pot, which is connected with the latter by three flues T, which alternate with the branches H of said chamber G. The said smoke-flue S is connected, by means of a plurality of vertical flues U, with a lower annular smoke-flue V, surrounding the fire-pot just above the grate. Flues W connect each of said annular smoke-flues S and V with a pipe X, leading to the chimney, said upper flue W being provided with a damper Y. At the point where said two sections D and E of said fire-pot A are joined the section E is provided with an annular chamber or flue E', which is extended outwardly at one point and there connects with a downwardly-extending pipe $E^2$, through which air is fed to said chamber E'. The said chamber E' is connected with the interior of the fire-pot A by means of the perforations $E^3$. In feeding the fire the fresh coal is primarily freed of gas, and such gas cannot burn unless a fresh supply of air is introduced above the fire to supply enough oxygen to permit combustion. The air thus fed through said perforations $E^3$ cause the generated gases to burn instead of passing out of the chimney, so that no part of the fuel is wasted. Between the dome of the fire-pot and the annular smoke-flue S are three air-passages Z, through which part of the air passes, the remainder passing through the annular space Z' between said smoke-flue S and the casing Q.

In order to prevent the too rapid passage of the air, the said smoke-flue S is provided at its upper end with an annular flange $Z^2$, between which and the casing Q is a very small annular space and which is provided with perforations. The said flange is obviously a conductor of heat which is absorbed by the passing air and serves, further, to resist the passage of such air, thereby causing the major portion to be deflected through the passages Z. The fire-pot A is provided with an exterior radiating flange $E^4$, similar to the flange $Z^2$, just above said water-chamber F, said flange $E^4$ being perforated to provide additional radiating-surface. The air in passing through said casing Q is thus brought into direct contact with the walls of the ash-pit and fire-pot and the walls of the annular and vertical smoke-flues, thus absorbing the greatest possible amount of heat and utilizing the heat of the fire to the greatest possible extent. In order to supply to such air a healthy degree of moisture, I provide a water-pan A′ around said ash-pit C, which is filled with water through the spout V′, which is evaporated and carried by the air to the various rooms of the building. The double connection of the water-chamber L of said drum K with the pipe J is made to prevent the water in said drum from being exhausted by rapid generation of steam, such double connection serving to permit rapid circulation.

I claim as my invention—

1. In a heater, the combination with the fire-pot, and a water-chamber in the dome thereof, of a water-drum in said fire-pot, a pipe connecting the upper end of said drum with the water-chamber in said dome, a second pipe connecting the lower end of said drum with said first-named pipe, and connection between said water-chamber in said dome and radiators through which the water heated in said dome and drum is adapted to circulate.

2. In a heater, the combination with the fire-pot, an annular smoke-flue above the same, flues connecting the same with said fire-pot, an annular smoke-flue surrounding said fire-pot at its lower end, vertical flues connecting said annular smoke-flues, connection between said smoke-flues and a chimney, passages between the dome of the fire-pot and the upper annular smoke-flue, a circumferential perforated flange on said upper annular smoke-flue, a concentric casing surrounding said fire-pot and smoke-flues, air-inlets at the lower end of said casing, hot-air flues leading from the upper end of said casing to the various parts of the building, the air entering said casing being adapted to come in contact with the hot surfaces of said fire-pots and smoke-flues and absorb heat therefrom, a water-jacket in the dome of said fire-pot, a water-drum in said fire-pot, a pipe connecting the upper end of said drum with the water-chamber in said dome, a second pipe connecting the lower end of said drum with the first-mentioned pipe and connection between said water-chamber in said dome and radiators through which the water heated in said dome and drum is adapted to circulate, substantially as described.

3. In a heater, the combination with a casing, a fire-pot therein, smoke-flues within said casing connected with said fire-pot and with a chimney, air-passages between said smoke-flues and said fire-pot, air-inlets at the lower end of said casing, and hot-air flues leading from the upper end of said casing to various parts of the building, of water-chambers in the walls of said fire-pot, a water-jacket in the dome of said fire-pot, connections between said water-chambers in the walls of said fire-pot and said water-jacket in the dome of said fire-pot to cause circulation from one to the other, a water-drum in said fire-pot, a pipe connecting the upper end of said drum with the water-chamber in said dome, a second pipe connecting the lower end of said drum with the first-mentioned pipe and connections between said water-chambers and radiators through which the heated water is adapted to circulate.

In testimony whereof I affix my signature in presence of two witnesses.

JOHN R. BARKER.

Witnesses:
RUDOLPH WM. LOTZ,
ARTHUR A. LOTZ.